United States Patent [19]

Smith et al.

[11] 4,352,259
[45] Oct. 5, 1982

[54] MOVABLE INFLATABLE CEILING OR PARTITION FOR GREENHOUSE USE

[75] Inventors: Richard W. Smith, Rumson; Robert H. Frank, Freehold, both of N.J.

[73] Assignee: X. S. Smith, Inc., Red Bank, N.J.

[21] Appl. No.: 133,390

[22] Filed: Mar. 24, 1980

[51] Int. Cl.³ .............................................. E04B 1/34
[52] U.S. Cl. ............................................ 52/2; 52/64; 47/17
[58] Field of Search ................... 52/2, 64; 47/17, 28.1

[56] References Cited

U.S. PATENT DOCUMENTS

| | | | |
|---|---|---|---|
| 2,193,921 | 3/1940 | Gibbons | 47/17 |
| 3,249,682 | 5/1966 | Laing | 174/35 |
| 3,375,321 | 3/1968 | Laing | 174/35 |
| 3,727,345 | 4/1973 | Smith | 47/2 |
| 4,027,437 | 6/1977 | Monsky et al. | 52/2 |
| 4,038,788 | 8/1977 | Claessens | 52/2 |

FOREIGN PATENT DOCUMENTS 2403428  5/1979  France ..................................... 52/2

Primary Examiner—Carl D. Friedman
Attorney, Agent, or Firm—Nolte and Nolte

[57] ABSTRACT

An inflatable movable ceiling or partition is installed in a greenhouse to limit the interior volume of the greenhouse which must be heated by artificial means. The tubes are inflatable transparent plastic tubes, which are arranged longitudinally in the greenhouse, and when inflated form a complete false ceiling partition. When the tubes are deflated, they may be pushed back to lie against the sides of the greenhouse. The ceiling or partition is formed of adjacent cylindrical inflatable tubes which are in fluid communication by means of an inventive jumper system which forms an airtight seal between adjacent members. The jumpers may be installed at the time the system is installed in the greenhouse and the ends of the cylinders sealed by wire ties or they may be taped.

16 Claims, 6 Drawing Figures

MOVABLE INFLATABLE CEILING OR PARTITION FOR GREENHOUSE USE

BACKGROUND OF THE INVENTION

The present invention relates to inflatable tubes used as building partitions and particularly relates to inflatable tubes used as a temporary ceiling in a greenhouse.

The recent restrictions on energy availability and the emphasis on energy conservation have had a large impact on the horticultural industry. Specifically, on those plant growers who must rely upon the use of a greenhouse in order to produce and properly maintain plants. Therefore, even though present day greenhouses are being designed with energy conservation in mind, the vast majority of existing greenhouses are not particularly energy efficient.

It has been found that one effective approach toward lessening the amount of energy required to heat the interior of a greenhouse is to provide insulated wall curtains. Another approach is to provide a lowered ceiling, so as to lessen the interior volume of the greenhouse which must be heated. Recently, it has also been proposed to provide plastic side curtains and ceilings which permit sunlight to enter the greenhouse, while still reducing the interior volume of the greenhouse so that the heating facility used to heat the greenhouse interior has a reduced load.

Present approaches toward obtaining a more thermally efficient greenhouse suffer from several drawbacks, not the least of which is the complexity of the systems needed in order to block off portions of the greenhouse interior. Such complexity is manifested in the number of parts required in assembling the movable walls and ceilings. Obviously, systems which are intended to reduce heating costs must themselves be relatively economical to purchase, otherwise the situation becomes self-defeating. Another drawback found in present artificial ceilings is that when the ceilings are not actively reducing the greenhouse interior volume, the artificial ceiling blocks or interferes with the normal admission of sunlight into the interior of the greenhouse. This then severely hampers the initial purpose of the greenhouse.

SUMMARY OF THE INVENTION

The present invention provides a movable inflatable ceiling system which is specifically intended to reduce the height of the ceiling in a conventional greenhouse. The inventive system provides a plurality of thin-walled substantially transparent plastic tubes, which are interconnected by means of an inventive fluid communicative jumper system. The tubes are suspended from cables or bars arranged interior to the greenhouse, and the tubes are connected to suitable blowers or fans for inflation. The tubes are arranged so that when they are inflated they expand and provide a false horizontal ceiling area at a predetermined height in the greenhouse. The air must be continuously provided to cause the tubes to remain inflated. When it is desired to remove the artificial ceiling, air is released from the tubes by turning off the blower. The tubes then slowly deflate, allowing the separated interior volumes slowly to reach a thermal equilibrium. The deflated tubes are then manually pushed back to the sides, thereby permitting essentially all of the available ambient light to enter the greenhouse and returning the greenhouse once again to its original interior volume, at least in regard to the height of the ceiling.

When employed as a movable inflatable wall, the invention can effectively provide thermal insulation for such wall without blocking all of the sunlight. The inventive wall can be arranged adjacent an existing greenhouse wall or it can be a freestanding partition used to reduce the interior volume of the greenhouse.

The inventive inflated tubes are arranged parallel with the longitudinal axis of the greenhouse and, when pushed back to the sides, or when permitted to fall to the floor, of the greenhouse offer little or no restriction to the entrance of ambient sunlight. The tubes forming the ceiling or partition are interconnected by means of specialized jumpers which permit rapid and easy installation of the ceiling in a simple and inexpensive manner.

Therefore, it is an object of the present invention to provide a temporary inflatable ceiling or partition for a greenhouse which serves to decrease the interior volume of the greenhouse.

It is a further object of the present invention to provide a movable temporary ceiling or partition which is installed by inflating plastic tubes which expand to form the desired ceiling or partition.

It is another object of the present invention to provide a movable inflatable greenhouse ceiling formed of tubes which are arranged having their longitudinal axis parallel with the longitudinal axis of the greenhouse and which are removable to the sides of the greenhouse.

It is still a further object of the present invention to provide a movable, inflatable ceiling or partition for a greenhouse formed of plastic tubes, wherein the tubes are in fluid communication by means of specialized jumpers.

The manner in which these and other objects are accomplished by the present invention will become apparent from the following detailed description.

DETAILED DESCRIPTION OF THE INVENTION

Figure 1:
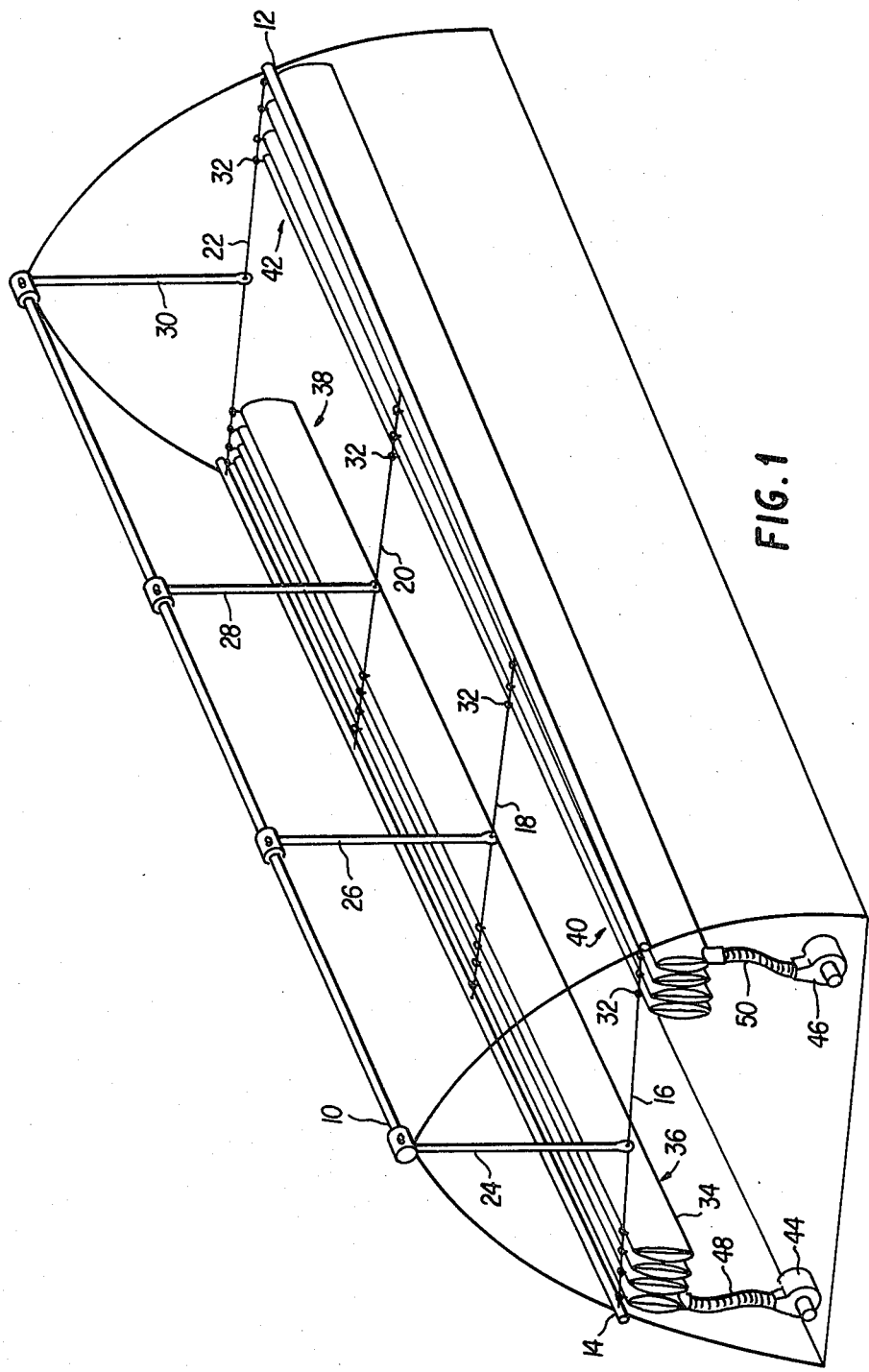
FIG. 1 is a perspective of a greenhouse having the inventive ceiling installed therein and in a deflated condition.

Referring now to FIG. 1, a typical greenhouse construction is shown in outline form. Although this greenhouse has generally an A-frame type construction, the present invention is useful on all types of greenhouse construction. The greenhouse of FIG. 1 is formed having a ridge-pole element 10 and two similar lateral elements, 12 and 14. The inventive ceiling suspension system is attached to these three elements which, as shown in FIG. 1, are represented by pipes or rigid tubes. The present invention is suspended from wires or cables 16, 18, 20, and 22, which are stretched between the two lateral elements, 12 and 14. In the embodiment of FIG. 1, a spacing of eight feet between the adjacent support cables has been found to be preferable. Each wire is supported at its midpoint by supports 24, 26, 28, and 30, which are each suspended from the ridge pole 10. The individual inflatable tubes which will form the ceiling are suspended by hanger means, shown typically at 32, from the cables in a slidable fashion. The inflatable tubes, one of which is shown typically at 34, are each essentially light transmissive, formed of transparent polyethylene film and are arranged having their longitudinal axes parallel with the longitudinal axis of the greenhouse. Nevertheless, it is suggested that the entire ceiling assembly could be arranged so that the tubes are perpendicular to the longitudinal axis of the greenhouse, while still following the essential teaching of the present invention.

The hangers 32 are formed so that they clamp onto the tubes 34 without puncturing the tube. They may be springloaded clamps similar to those used to clamp papers together or they may be specially formed plastic clamps which positively clip onto the top surface of the tube.

The transverse cables 16, 18, 20, and 22 and the several hanger means 32 cooperate to permit the tubes 34 to move in a direction which is perpendicular to the longitudinal axis of the greenhouse. As may be seen in FIG. 1, the tubes on the left side of the greenhouse are arranged so that when they are inflated they will create one half of the temporary greenhouse ceiling. Every tube on each side is in fluid communication with the tube adjacent it by means of the inventive jumpers, which are installed in the tubes at the locations shown generally by the arrows 36, 38, 40, and 42. The jumpers are located inside the inflatable tubes 34 and, thus, are not visible in FIG. 1; however, their construction will be shown in more detail hereinbelow.

Each group of inflatable tubes, as represented by the one group arranged on the left side, and the other group arranged on the right side, of the greenhouse, is provided with a blower, 44 and 46, which is connected to its respective inflatable tube group by flexible tubes, 48 and 50. The tubes, 48 and 50, may be 5 inch diameter tubes formed of 8-12 mil gauge vinyl. The blowers, 44 and 46, may comprise squirrel-cage fans rated for continuous service at 25 W., 110 VAC. It is understood that although the present embodiment uses this specific jumper arrangement, other means for placing the tubes in fluid communication could be employed while practicing the instant invention. For example, an arrangement of tubes, or the like, formed as a manifold, could be employed.

Figure 2:
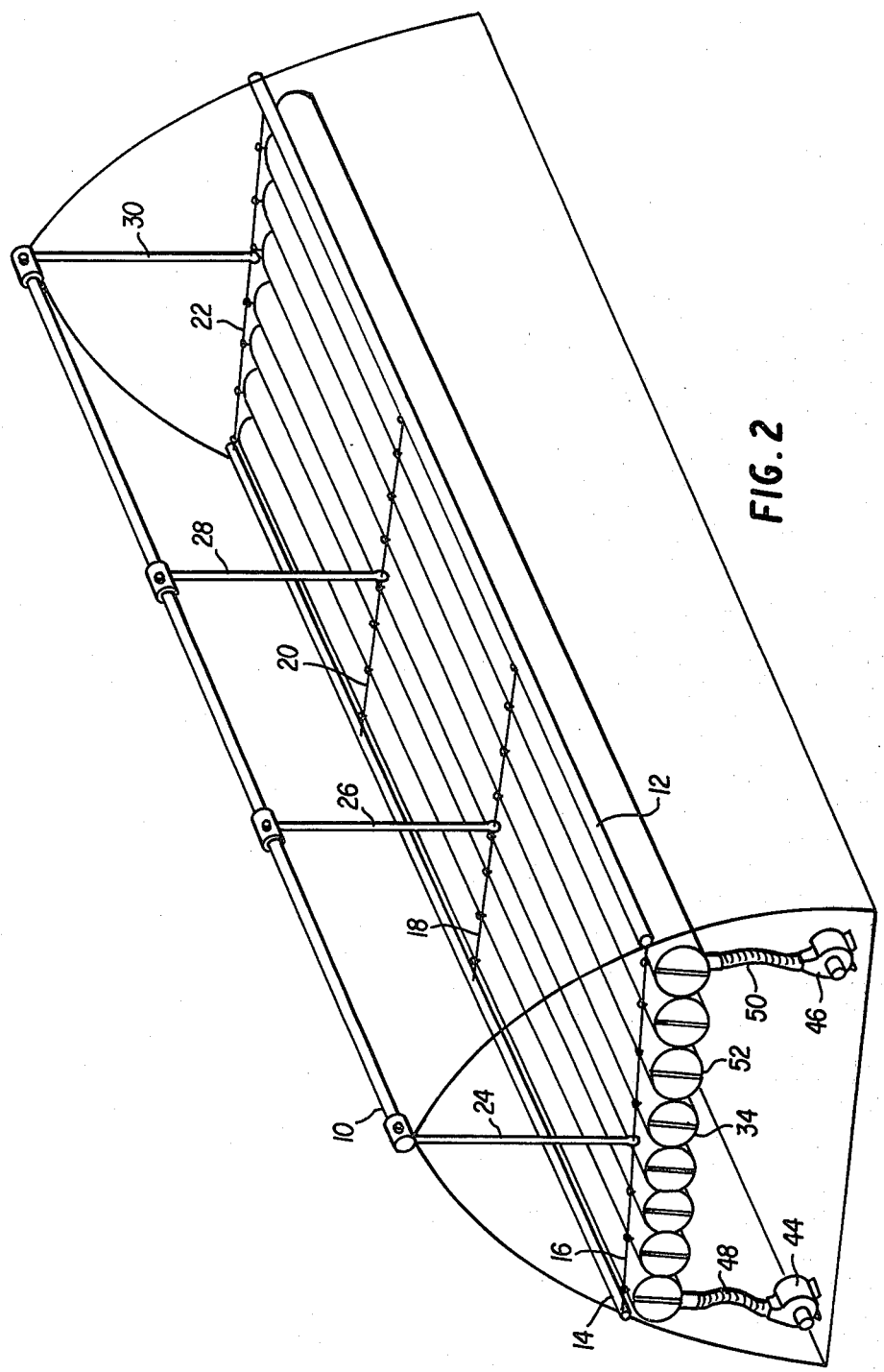
FIG. 2 is a perspective of a greenhouse having the present invention inflated so as to form the ceiling.

Referring to FIG. 2, upon actuation of the blowers, 44 and 46, the inflatable tubes 34 are expanded to form an entirely new ceiling for the greenhouse. In this manner, the entire upper portion of the greenhouse is physically isolated and thermally insulated from the lower portion containing plants and the like which are undergoing propagation and cultivation. The blowers, 44 and 46, must be operated continuously to keep the tubes inflated As indicated above, the adjacent tubes in each group arranged on the right and left sides of the center line of the greenhouse are connected by means of inventive fluid communicative jumpers. These jumpers are shown in more detail in FIG. 3. As the tubes are deflating the two volumes of air, now at different temperatures, will mix and reach a thermal equilibrium. If it is found that the cold air is falling down into the warmer space too quickly, then the deflation rate of the tubes may be controlled by suitable means.

Figure 3:
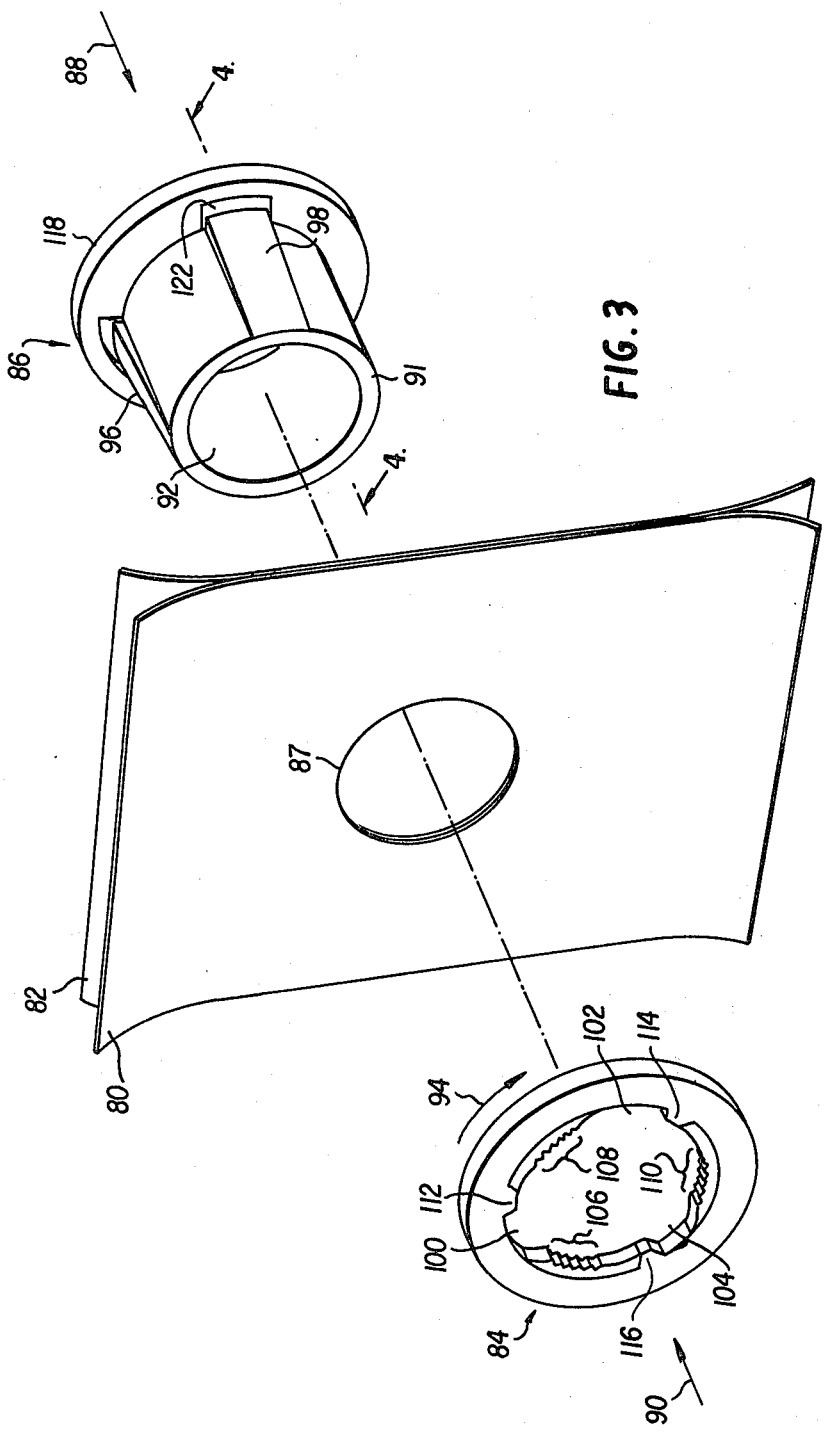
FIG. 3 is an exploded perspective of the inventive jumper system.

Referring then to FIG. 3, two typical portions or segments of plastic sheet, 80 and 82, are shown, which represent the adjacent side walls of two adjacent tubes. It is these two side walls which are to be joined by the inventive jumper assembly formed of a ring element 84 and a tubular element 86. First, a one and one-half inch hole is cut in the wall of each of the adjacent tubes. Although only one hole 87 can be seen in FIG. 3, it is understood that there are actually two such holes in alignment with each other. In assembling the inventive jumper, the tubular element 86 is moved in the direction of arrow 88 and the ring element 84 is moved in the direction of arrow 90, with the protruding portion 91 being passed through the holes at 87. The ring 84 is forced over the protruding portion 91 formed as an integral part of the tubular element 86, thereby firmly sandwiching the two plastic sheets, 80 and 82. Upon placing the ring element 84 over the tubular protruding portion 91, the ring element 84 is rotated in the direction of arrow 94 and is locked with element 86, in a manner which will be shown in more detail hereinbelow. This operation causes the interiors of the two adjacent tubes represented by the sheets, 80 and 82, to be in fluid communication with each other.

Tubular element 86 is provided with three upraised aligning and locking elements, two of which are seen at 96 and 98. These elements 96 and 98, cooperate with slots, 100 and 102, respectively, formed in the ring element 84. Element 86 also has a third aligning and locking element hidden from view in FIG. 3, which cooperates with slot 104 in element 84. Assuming that the two elements, 84 and 86, are assembled and, upon rotating the ring member 84 in the direction of arrow 94, the toothed surfaces 106, 108, and 110, interact with means located behind each aligning and locking element, which firmly grasp the sheet-like materials, 80 and 82. Large upraised portions 112, 114, and 116 in ring element 84 serve to prevent it from rotating in the direction counter to arrow 94, after the ring member 84 has been installed over the tubular protruding portion 91. Element 86 is provided with a large flange-like element 118 which permits element 86 to be handled in an easy manner and also provides a structural backup for the assembled tube portions, 80 and 82, thereby preventing the jumper assembly from being torn from the inflated tubes.

Figure 4:
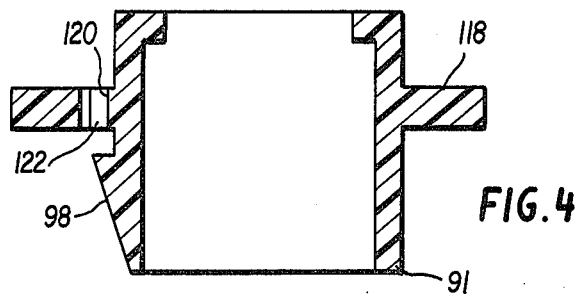
FIG. 4 is a side elevation in cross section taken along section lines 4—4 of FIG. 3 of one element of the inventive jumper system.

Referring now to FIG. 4, the tubular element 86 of FIG. 3 is shown in cross section taken along section line 4—4 of FIG. 3. The aligning and locking element 98 is seen to protrude outwardly and, as indicated above, is intended to cooperate with the appropriate gap or space in the ring member 84. In order to lock the two elements of the inventive jumper, one to another, the toothed surfaces 106, 108, and 110 are provided, each of which interacts, respectively, with one of three upraised teeth in member 86. One such upraised tooth is shown at 120. The three upraised teeth are located on the shank of the element 86 and tooth 120 is located in the vicinity of a gap 122, formed in the large flange-like element 118 of element 86. Each of the three upraised teeth are similarly arranged in relation to a gap in the flange-like element 118.

Figure 5:
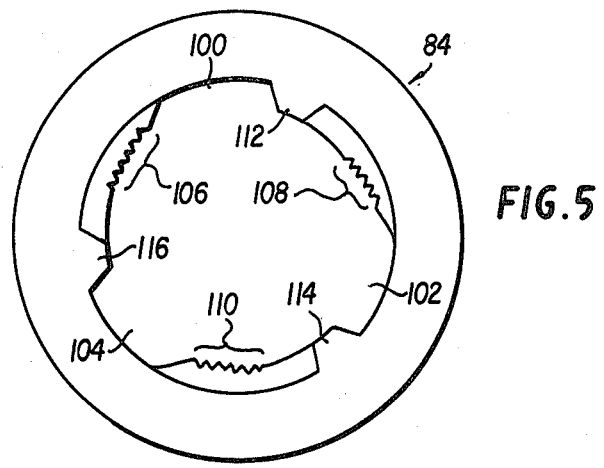
FIG. 5 is a top plan view of the other element of the inventive jumper system.

In FIG. 5, a top plan view of element 84 is shown, wherein the toothed surfaces 106, 108, and 110 are seen more clearly. As seen in FIGS. 3, 4, and 5 the toothed surfaces 106, 108, and 110 are provided on an inner surface of the ring element 84 at a position which is below or lower than the stop elements 112, 114, and 116 in the upper plane of the ring element 84. It is this portion of the ring element 84 which is intended to fit behind the three aligning and locking elements, 96 and 98, in the vicinity of the relieved portions or gaps, 122 and 124, in the flange-like member 118.

A typical sequence of the installation and operation of the inventive system is as follows. The first step is to determine the size and number of tubes needed to cover the ceiling of the particular greenhouse. The tubes may be advantageously formed having diameters of 18, 24, or 30 inches. Thus, the tube diameter chosen should result in an integral number of tubes necessary to span the greenhouse ceiling. Ideally, it has been found that each tube should deform approximately two inches where it abuts the adjacent tube or where it abuts the existing greenhouse wall. Thus, each tube should be considered as having a diameter approximately four inches less than nominal when figuring the number of tubes needed to span the ceiling. For example, if the greenhouse is approximately twenty-five feet wide, then approximately twenty-two eighteen-inch diameter tubes should be used to form a tightly sealed temporary ceiling.

Similarly, the length of the tubes should be somewhat longer than the actual length of the greenhouse so that upon inflation the tubes will deform slightly and firmly abut the end walls of the greenhouse.

The next step then is to install the suspension system consisting of the cross cables, 16, 18, 20, and 22 and the vertical supporting members 24, 26, 28, and 30. The height of the suspension system above the greenhouse floor, and correspondingly the length of the vertical supporting members, is determined by the desired height of the temporary ceiling. it is also noted when using eighteen-inch diameter tubes that in their relaxed state they will hang down approximately twenty-eight inches.

Alternatively, although the inventive inflatable ceiling has been described as being a horizontal ceiling, if the center points of the cables 16, 18, 20, and 22 are located above the outer end points thereof, then the tubes and hangers will slide under the forces of gravity to the sides of the greenhouse in their deflated state. This central longitudinal peak in the inflatable ceiling is achieved by using shortened suspension members 24, 26, 28, and 30. The outward incline of the suspension cables need not be excessive and such slope will not hinder the automatic movement of the tubes as they are inflated but is sufficient to permit the hangers 32 to slide downwardly and outwardly on the cross cables. If the pitch on these cables 16, 18, 20, and 22 is not sufficient to permit automatic sliding of the deflated tubes, it will still make the job of sliding the tubes to the sides easier.

Once the suspension system is in position, the inflatable tubes 34 may be hung from the cables by clamping the hanger means 32 to the tubes 34 at intervals along their top surfaces. At this time, it is then necessary to interconnect the various tubes, so that their interiors will be in fluid communication. Thus, the inventive jumper assemblies are arranged at the points shown by the arrows in FIG. 1 and the two elements making up the jumper are assembled, as shown in FIG. 3 with the two sheet elements, 80 and 82, representing the walls of the adjacent tubes being joined. The jumpers are installed at points approximately one foot from each end of the inflatable tubes, so that adjacent tubes are placed in total mutual fluid communication.

As indicated above, the jumpers are positioned at each end of the inflatable tubes, at locations one foot from the end. Thus, in the installation of FIG. 1, there are twelve jumpers utilized to interconnect the four separate tubes in each group. When the jumpers are in place, the ends of the tubes may be sealed with wire ties or they may be taped. Thus, the inflatable tubes are assembled so that they are in mutual fluid communication and are sealed at each end. The tubular flexible hoses, 48 and 50, which may be five-inch diameter tubes formed of 8–12 mil vinyl, are sealingly attached to inflatable tubes at one end and attached to the respective blowers, 44 and 46, at the other ends. At this point, the system is considered to be installed and, upon actuating the blowers the tubes will sequentially inflate, since they are all in internal fluid communication with each other. Upon inflating, the collapsed tubes will become cylindrical and will be forced towards the center of the greenhouse, and into the position shown typically in FIG. 2. When the false ceiling is no longer desired, the air is released from the tubes, they slowly collapse, permitting the two separated air masses to mix and reach thermal equilibrium, and the deflated tubes are manually slid back to the sides of the greenhouse.

Figure 6:
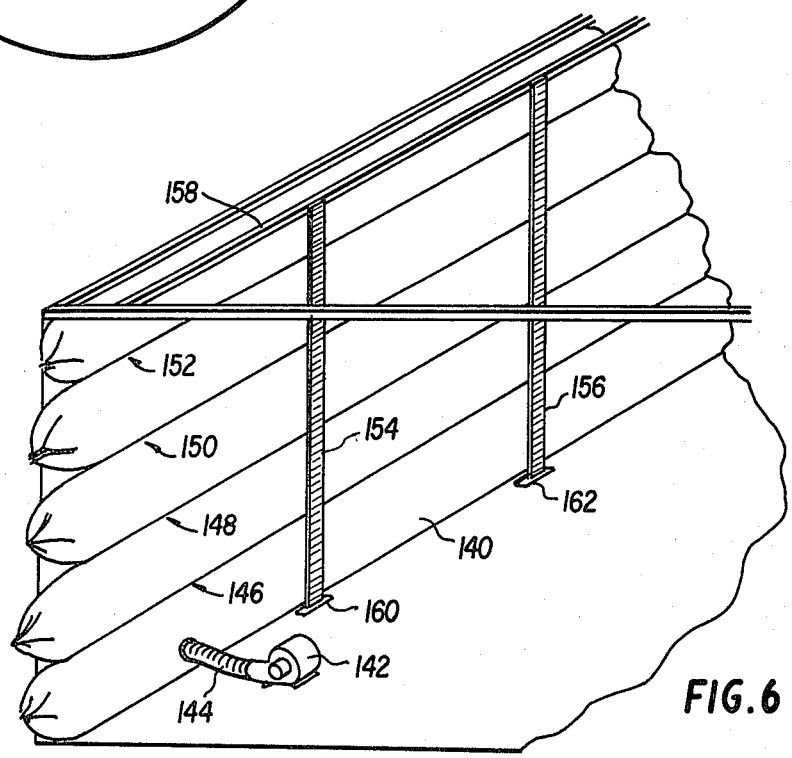
FIG. 6 is a perspective of a portion of a greenhouse having the present invention arranged to form an inflatable thermal insulating wall.

Referring now to FIG. 6, the present invention is shown being employed as a means for thermally insulating a wall of a greenhouse. Again, transparent polyethylene film is used for the tubes, shown typically at 140. The tubes 140 are arranged so that their longitudinal axes are parallel with the floor of the greenhouse, so that the inflated tubes resemble the logs of a log cabin. As indicated above the length of the tubes should be chosen to be somewhat longer that the wall to be insulated so that the inflated tubes will abut the end walls of the greenhouse, thereby deforming a certain amount and forming a substantially airtight seal. The tubes 140 are inflated by a blower 142, identified above. The blower 142 is connected to the bottommost one of the tubes 140 by a flexible tube 144 approximately 5 inches in diameter and formed of 8–12 mil gauge vinyl.

The tubes 140 are placed in fluid communication by means of the inventive jumper system described above. The jumpers connect the adjacent tubes at locations shown generally at 146, 148, 150, and 152.

The inflated insulating wall is kept in position by the actual greenhouse wall itself and straps, 154 and 156, which are vertically arranged. The straps are affixed to an upper support 158 of the greenhouse and also to the floor of the greenhouse, at 160 and 162, respectively. The straps are advantageously arranged every 6 feet along the length of the wall. These straps may be formed of any appropriate material such as nylon, or alternatively rigid elements may be employed in place of the straps. In any event, the purpose of the straps is to maintain the tubes in alignment as they are inflated or deflated and then to retain the inflated tubes against the existing greenhouse wall.

If the inventive inflatable wall is to act as a freestanding wall to reduce the interior volume of a greenhouse, then two sets of straps are used, one on either side of the inflatable wall. The straps perform the same function as above, i.e., maintain alignment of the tubes during inflation/deflation and retain the inflated wall-like configuration.

The installation of the inventive insulating inflatable wall is similar to that of the ceiling described above.

The straps, 154 and 156, are affixed at the top and bottom to the existing greenhouse at six foot intervals along the length of the wall. Once again the inflated diameter of an inflated tube is chosen so that an integral number of tubes will form a wall having a height a little bit more than the height of the actual wall. In this way the inflated tubes are deformed somewhat from a circular diameter, so they form an airtight seal. The length is also chosen to be slightly longer than the existing wall.

Once the tube size has been chosen, the first tube is arranged along the wall, between the strap and the wall. Two one and one-half inch holes for the jumpers are made in the tube located one foot from each end. The next tube is similarly arranged, the jumper holes are aligned, and the jumpers are connected as described above. The remaining tubes are similarly assembled and the ends of the tubes are sealed in an airtight manner by wire ties or tape. The connection with tube 144 should be made before the bottommost tube has its end sealed.

Thus, when the blower 142 is energized, the tubes sequentially inflate and are forced upwardly to form a thermal insulating wall, which is filled tightly into the space alotted for it.

Although FIG. 6 does not show the inventive ceiling it should be understood that the inventive wall or partition assembly can be used in combination with the inventive ceiling construction to enclose a space totally with inflatable tubes, save for the floor.

The above detailed description is presented by way of example only, and is not intended to limit the scope of the present invention, except as set forth in the appended claims.

What is claimed is:

1. Apparatus for reducing the interior volume of a structure, comprising:
a plurality of flexible inflatable tubes movably arranged within the structure;
a plurality of rigid tubular jumper means each having a central through passage affixed in holes formed in the longitudinal side walls of adjacent ones of said plurality of tubes and being located a predetermined distance from the ends of said tubes for placing said tubes in mutual fluid communication;
inflation means connected to at least one of said tubes, selectably operable for causing said tubes to be in an inflated state;
means for constraining the extent of movement of said tubes, both in the inflated state and the deflated state, whereby upon inflation said tubes are constrained to form a substantially planar surface; and
said movement constraining means includes means arranged vertically within the structure for locating said plurality of tubes substantially parallel to the walls of the structure and for constraining the movement of said tubes to be in a substantially vertical plane.

2. The apparatus of claim 1, further including means affixed to the structure for supporting said plurality of tubes a predetermined height above the floor of the structure.

3. The apparatus of claim 2, further including clamp means for clamping onto said plurality of tubes and being slidingly affixed to said means for supporting said plurality of tubes within the structure so that the tubes are aligned with the longitudinal axis of the structure.

4. The apparatus of claim 1, wherein said means arranged vertically includes strap means affixed at both ends to the structure and defining said substantially vertical plane.

5. Apparatus for limiting the interior volume of a greenhouse, comprising
a plurality of discrete, inflatable, flexible tubes, independent one from another;
support means attached to the greenhouse for supporting said tubes at a predetermined height above the floor of the greenhouse;
attachment means for slidingly attaching said plurality of tubes to said support means such that the said tubes are aligned with the longitudinal axis of the greenhouse and are slidable in a horizontal direction perpendicular to the longitudinal axis of the greenhouse;
a plurality of jumper means formed of rigid material and being affixed in the walls of adjacent ones of said plurality of tubes at points proximate the ends thereof for placing said adjacent ones of said tubes into mutual fluid communication; and
inflation means connected to said tubes for causing said flexible tubes to be in an inflated condition.

6. The apparatus of claim 5, wherein the greenhouse is of the kind having a ridge pole and wherein said support means include a plurality of flexible cable means affixed to the framework of the greenhouse and extending in a direction perpendicular to the longitudinal axis of the greenhouse, and a plurality of suspension means attached to the ridge pole of the greenhouse for suspending each of said cables at its midpoint from the ridge pole.

7. The apparatus of claim 5, wherein said inflation means includes first and second air blowers and first and second means for connecting said first and second air blowers, respectively, to the tubes arranged outermost on each longitudinal side of the greenhouse.

8. The apparatus of claim 5, wherein each of said plurality of jumper means includes a ring member for interlocking engagement with a tubular member having the side walls of the adjacent tubes sealingly captured therebetween, such that upon removal of a portion of said adjacent side walls the central passage of said tubular member provides said fluid communication between adjacent inflatable flexible tubes.

9. The apparatus of claim 5, wherein the greenhouse is of the kind having a ridge pole and wherein said plurality of inflatable flexible tubes includes first and second groups of tubes, one group arranged on either side of the ridge pole of the greenhouse and wherein only the adjacent tubes in each group are in fluid communication, whereby said first and second groups are not in fluid communication, and wherein said inflation means include first and second air blowers connected, respectively, to said first and second groups of tubes.

10. The apparatus of claim 5, wherein said plurality of inflatable flexible tubes are formed of plastic film which is at least translucent.

11. Apparatus for creating a false ceiling in a greenhouse, comprising:
a plurality of inflatable tubular means being sealed at each end and formed of flexible plastic film, the longitudinal axes of said tubular means being parallel with the longitudinal axis of said greenhouse;
support means attached to the greenhouse and to the plurality of tubular means and being arranged to support said plurality of inflatable tubular means at a predetermined height above the floor of the greenhouse;

jumper means formed of rigid material having a tubular through passage and being arranged in apertures formed in the side walls of adjacent ones of said tubular means for causing said adjacent ones of said plurality of tubular means to be in direct fluid communication;

said jumper means comprising a pair of mating parts including a ring and a tubular member each having means for effecting interlocking engagement therebetween; and blower means connected to at least one of said plurality of inflatable tubular means for inflating said plurality of tubular means which have been caused to be in fluid communication by said jumper means, whereby said plurality of inflated tubes form the false ceiling.

12. Apparatus for creating a false ceiling in a greenhouse, comprising:

a plurality of inflatable tubular means being sealed at each end and formed of flexible plastic film, the longitudinal axes of said tubular means being parallel with the longitudinal axis of said greenhouse;

support means attached to the greenhouse and to the plurality of tubular means and being arranged to support said plurality of inflatable tubular means at a predetermined height above the floor of the greenhouse;

said support means comprising cables attached to the greenhouse and arranged substantially perpendicularly to the longitudinal axes of the plurality of tubular means, and means for slidingly attaching said plurality of tubular means to said cables so as to permit said plurality of tubular means to slidingly move in a horizontal plane in a direction perpendicular to the longitudinal axes of said plurality of tubular means;

jumper means formed of rigid material having a tubular through passage and being arranged in apertures formed in the side walls of adjacent ones of said tubular means for causing said adjacent ones of said plurality of tubular means to be in direct fluid communication; and blower means connected to at least one of said plurality of inflatable tubular means for inflating said plurality of tubular means which have been caused to be in fluid communication by said jumper means, whereby said plurality of inflated tubes form the false ceiling.

13. The apparatus of claim 12, wherein the greenhouse is of the kind having a ridge pole and further including means attached to the ridge pole of the greenhouse and to the midpoint of said cables for supporting same at a predetermined height above the floor of the greenhouse.

14. A method of forming a ceiling in a greenhouse, comprising the steps of:

installing support means inside the greenhouse, attaching a plurality of collapsed inflatable tubes to the support means at a predetermined height above the greenhouse floor, and arranging the tubes with their axes parallel with the longitudinal axis of the greenhouse, installing at least one jumper means in the side walls of adjacent tubes and placing the interiors of the adjacent tubes in fluid communication one with another, sealing the ends of the tubes so as to make each tube end substantially airtight;

connecting an inflation means to at least one of the inflatable tube;

inflating the collapsed tubes to an inflated state having a greater cross section than in the collapsed state, thereby forming a lowered ceiling in the greenhouse;

the step of installing jumper means including the further steps of placing the side walls of adjacent tubes in contact one with another, placing a tubular-shaped member of the jumper means into one of the adjacent tubes in the vicinity of the contacted side walls, placing a ring-shaped member of the jumper means into the other adjacent tube and aligned with the tubular-shaped member, bringing the ring-shaped member and the tubular-shaped member into engagement, thereby stretching portions of the two adjacent tubes over an end of the tubular-shaped member, and piercing the portions of the adjacent tubes which have been stretched over the end of the tubular-shaped member, so that the two adjacent tubes are in fluid communication one with another by means of the tubular member.

15. The method of claim 14, wherein the greenhouse is of the kind having a ridge pole and wherein the step of installing the support means includes the steps of connecting cable means to the sides of the greenhouse, arranging the cable perpendicularly to the longitudinal axis of the greenhouse, installing vertical support members from the ridge pole of the greenhouse to the midpoint of each of the cables for supporting same.

16. The method of claim 14, wherein the step of installing jumper means includes the step of installing a jumper means at each end of adjacent tubes, and positioning the jumper means at least one foot from each end of the adjacent tubes.

* * * * *